United States Patent [19]

Gagliardi, Jr.

[11] Patent Number: 5,195,924

[45] Date of Patent: Mar. 23, 1993

[54] METHOD OF BUTCHERING AN ANIMAL CARCASS TO PRODUCE A GENERALLY FLAT, BONELESS MEAT PRODUCT AND MEAT PRODUCT PRODUCED

[75] Inventor: Eugene D. Gagliardi, Jr., West Chester, Pa.

[73] Assignee: Designer Foods, Inc., Wilmington, Del.

[21] Appl. No.: 896,938

[22] Filed: Jun. 11, 1992

[51] Int. Cl.⁵ .................................................. A22C 7/00
[52] U.S. Cl. .................................... 452/149; 452/174; 452/198
[58] Field of Search ................ 452/174, 149, 135, 198

[56] References Cited

U.S. PATENT DOCUMENTS

| | | | |
|---|---|---|---|
| 4,210,677 | 7/1980 | Huffman | 452/141 |
| 4,356,205 | 10/1982 | Richards | 452/149 |
| 4,363,822 | 12/1982 | Kleptz | 426/516 |
| 4,818,548 | 4/1989 | Cheng | 426/324 |

Primary Examiner—Willis Little
Attorney, Agent, or Firm—Panitch, Schwarze, Jacobs & Nadel

[57] ABSTRACT

A method is disclosed for butchering a portion of an animal carcass to form a flat, boneless meat product, wherein the animal carcass portion being butchered contains a boneless, generally cylindrically shaped muscle portion. The method includes cutting the animal carcass to remove the muscle portion and then forming from the removed rib eye muscle portion a generally cylindrically shaped base. Then, a first cut is made which extends into the cylindrically shaped base along a cut line extending generally from one end of the cylindrically shaped base to the other end. Next, a second cut is made which extends from the first cut and extends generally circumferentially with respect to the cylindrically shaped base from one end surface to the other along the cylindrically shaped base, wherein the second cut continues to extend to the center axis of the cylindrically shaped base along a generally helically shaped path. As the second cut is made, a generally flat meat product is continuously removed or unrolled from the cylindrically shaped base, the flat meat product being the product of the process of the present invention.

22 Claims, 3 Drawing Sheets

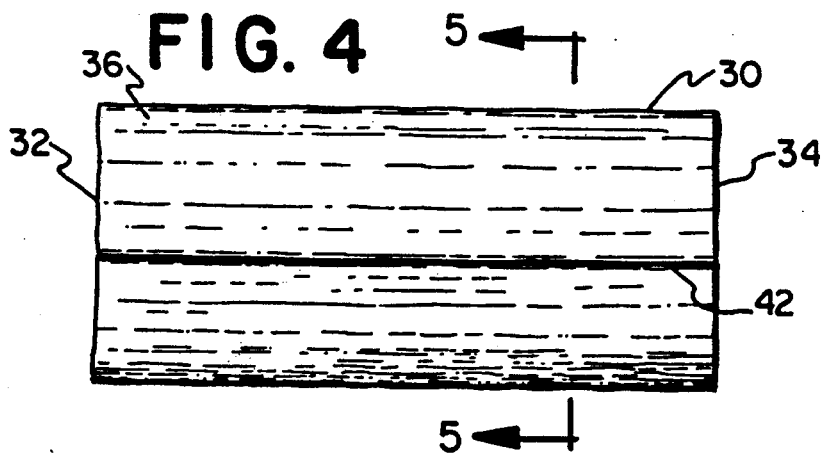
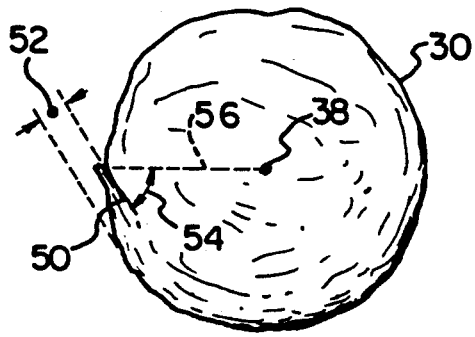
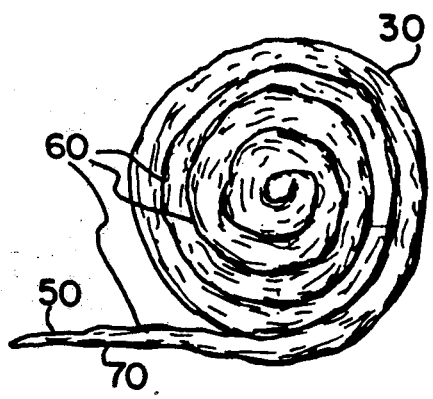
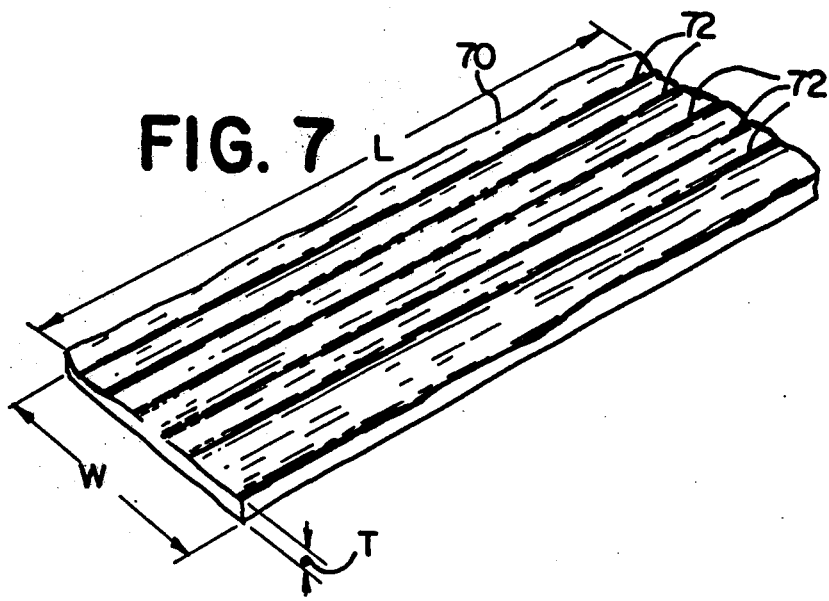

METHOD OF BUTCHERING AN ANIMAL CARCASS TO PRODUCE A GENERALLY FLAT, BONELESS MEAT PRODUCT AND MEAT PRODUCT PRODUCED

BACKGROUND OF THE INVENTION

The present invention generally relates to a method of butchering an animal carcass to obtain a specific cut. More specifically, the present invention is related to a method of butchering an animal carcass having a generally cylindrically shaped muscle or meat portion to produce a generally flat, boneless meat product.

Recently, the cost involved in obtaining, feeding, raising, and bringing to market an edible animal, such as a pig, cow, etc., has skyrocketed. Due to the tremendous increase in costs and, assuming that only reasonable increases may be made in the market price charged to the consumer for meat products without adversely affecting consumer demand, it has become increasingly important to more skillfully butcher animal carcasses in order to maximize the total meat yield in forms which are more desirable to consumers and, consequently, more profitable for food providers.

In addition to maximizing the total meat yield from animal carcasses, consumer tastes have become more sophisticated and the butchering methods must be changed to suit consumer taste. Consumers are now demanding new and different ways of purchasing and preparing meat products. In addition, consumers are willing to pay a premium for meat products which are interesting and convenient for their needs, such as flat, boneless meat products butchered from flavorful and appetizing portions of the animal carcass.

Consider, for example, pig carcasses. In the past, the traditional manner of butchering a pig carcass included the removal of the pork shoulder (also called the shoulder cut or Boston Butt portion) from the pig carcass. FIG. 1 shows the pork shoulder 12 removed from a pig carcass 10. As is conventionally known, the pork shoulder 12 contains a significant amount of irregularly positioned bones, fat, and gristle. Due to the irregular positioning of the bones, fat, and gristle, it is difficult to obtain meat from the pork shoulder 12 and, consequently, the pork shoulder 12 is not considered desirable by consumers or food producers. However, the pork shoulder 12 includes a very desirable and flavorful portion called the rib eye muscle portion (also called the Cottage Butt portion), which is a continuation of the rib eye muscle (not shown) which runs the length of the backbone of the pig carcass. FIG. 2 shows the rib eye muscle portion 20 contained in the pork shoulder 12 of FIG. 1. As is well known, the rib eye muscle portion 20 is generally cylindrical in shape and is desirable because its meat has a flavorful taste and texture which is similar to pork spare ribs. However, because the pork shoulder 12 as a whole is difficult to butcher (due to the irregularly positioned bones, fat, and gristle contained therein), and because the rib eye muscle portion 20 is relatively small in size, the rib eye muscle portion 20 is not conventionally butchered separately from the other parts of the pork shoulder 12. Instead, any meat which is obtained from the pork shoulder 12, including the rib eye muscle portion 20, is conventionally ground up and used as filler for sausage and related products. Therefore, conventionally the pork shoulder 12 of a pig carcass, including the rib eye muscle portion 20, has a relatively low per pound value to food producers since sausage is relatively inexpensive.

The present invention comprises a method for butchering a generally cylindrically shaped meat or muscle portion of an animal carcass (such as the rib eye muscle portion of a pig carcass) in order to produce a generally flat, boneless meat product. The generally flat, boneless meat product produced by the method of the present invention is expected to gain great consumer acceptance since it essentially represents a boneless meat steak, which is generally highly desired. The method of the present invention is relatively quick and easy to utilize, is easily reproducible, and is expected to obtain wide acceptance among food producers since it enables food producers to more skillfully butcher animal carcasses in order to maximize the total meat yield in forms (that is, boneless meat steaks) which are desired by consumers.

SUMMARY OF THE INVENTION

Briefly stated, the present invention relates to a method for forming a generally flat, boneless meat product from a generally cylindrically shaped meat or muscle portion of an animal, in the preferred embodiment the rib eye muscle portion in the shoulder cut of a pig carcass. In the preferred embodiment, the method comprises cutting the shoulder of a pig carcass to remove the rib eye muscle portion and then forming from the removed rib eye muscle portion a generally cylindrically shaped base having two generally circular spaced end surfaces, a generally continuous curved outer surface extending between the two end surfaces, and a center axis extending generally through the radial center of each of the end surfaces. A first cut is made which extends into the cylindrically shaped base a predetermined distance from the curved outer surface along a cut line extending generally from one end surface to the other along the curved outer surface and generally parallel to the center axis. Next, a second cut is made which extends from the first cut and extends generally circumferentially with respect to the cylindrically shaped base at the predetermined distance from the curved outer surface and extends generally from on end surface to the other along the cylindrically shaped base, and generally parallel to the center axis, wherein the second cut continues to extend to the center axis of the cylindrically shaped base along a generally helically shaped path when viewing the cylindrically shaped base from either end. As the second cut is made, a generally flat meat product is continuously removed from the cylindrically shaped base, wherein the flat meat product has a width generally corresponding to the distance between the two end surfaces, a thickness generally corresponding to the predetermined distance associated with the first cut, and a length determined by the length of the second cut extending from the first cut to the center axis of the cylindrically shaped base.

BRIEF DESCRIPTION OF THE DRAWINGS

The foregoing summary, as well as the following detailed description, will be better understood when read in conjunction with the appended drawings. For purposes of illustrating the invention, there is shown in the drawings embodiments which are presently preferred, it being understood, however, that this invention is not limited to the precise arrangements shown. In the drawings:

FIG. 4 is a side elevation view of the trimmed rib eye muscle portion of FIG. 3;

FIG. 5 is a sectional view of the trimmed rib eye muscle portion taken along lines 5—5 of FIG. 4;

FIG. 6 is an end view of the trimmed rib eye muscle portion after a second cut to the trimmed rib eye muscle portion is made;

FIG. 7 is a perspective view of the generally flat, boneless meat product (in the preferred embodiment, called a pork shoulder steak) produced by the present method.

DETAILED DESCRIPTION OF THE PREFERRED EMBODIMENTS

The present invention is directed to a method for butchering a portion of an animal carcass in order to produce a generally flat, boneless meat product and the meat product produced employing the method. The present method is described below with regard to the butchering of a pig carcass, and in particular, the butchering of the pork shoulder of a pig carcass, although it should be understood that such focus on the pork shoulder of the pig carcass is for illustrative purposes only and is not intended to limit the present invention in any manner. It is to be understood that the present method is equally applicable to other portions of the pig carcass and it is also applicable to all types of fowl, beef, poultry, etc., carcasses, including duck, turkey, squab, cow, and lamb, etc. The only requirement regarding the applicability of the present method to the butchering of a particular portion of a particular animal carcass is that the portion of the animal carcass being butchered include a muscle or meat portion (such as the rib eye muscle portion of the pork shoulder of a pig carcass) which can be trimmed and/or otherwise formed to generate a cylindrically shaped base.

Figure 1:
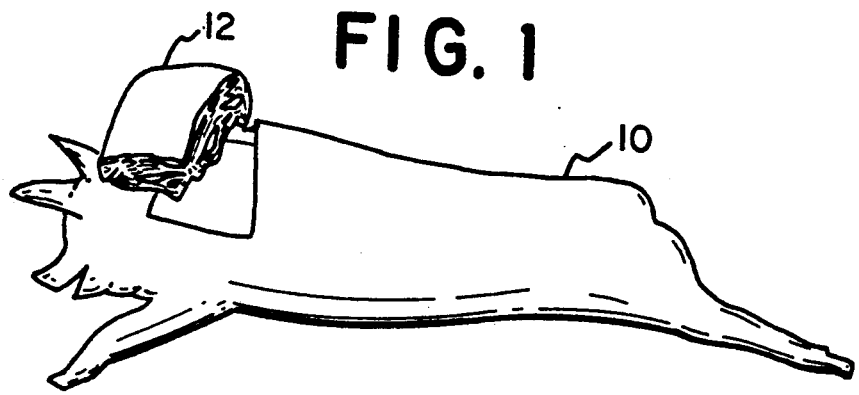
FIG. 1 is a side elevation schematic view of a pig carcass wherein a pork shoulder is removed therefrom.

Referring now in detail to the drawings, wherein like reference numerals indicate like elements throughout, and with regard to a preferred embodiment of the present invention, there is shown in FIG. 1 a side elevation schematic view of a pig carcass 10 from which the pork shoulder 12 (also called the shoulder cut or Boston Butt portion) was removed using conventional methods. The terms "pork shoulder", "shoulder cut", and "Boston Butt portion" are used interchangeably herein. The shoulder cut 12 is removed from the pig carcass 10 in a conventional manner using any conventional cutting means, such as a hand saw or a meat knife (not shown).

Figure 2:
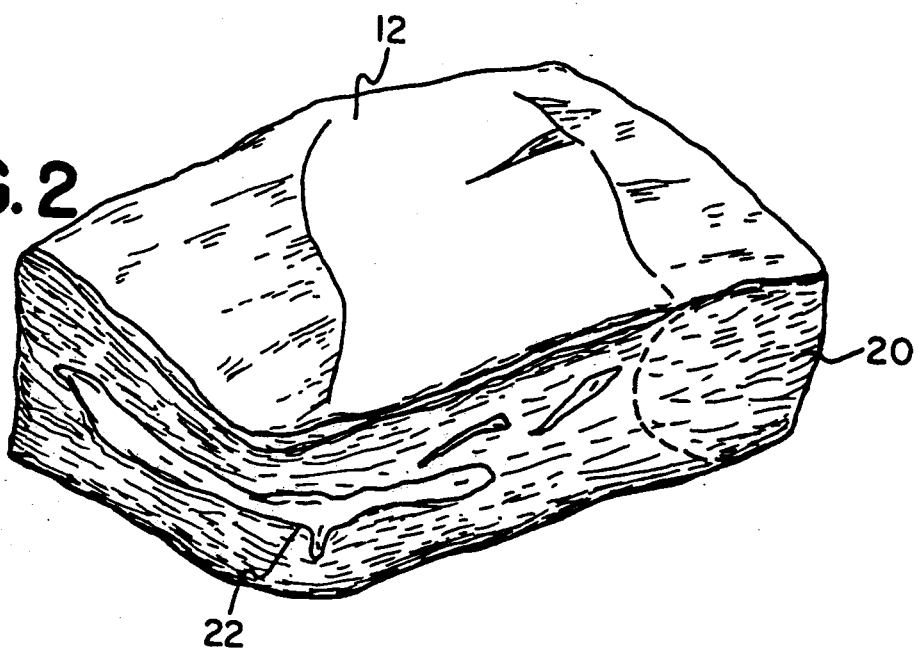
FIG. 2 is an enlarged perspective view of the pork shoulder of FIG. 1, delineating the pork shoulder rib eye muscle portion.

FIG. 2 is an enlarged perspective view of the shoulder cut 12 which was removed from the pig carcass 10 using conventional methods. As is conventionally known, the shoulder cut 12 includes a blade bone tip 22 and a rib eye muscle portion 20 (also called the Cottage Butt portion) which is a continuation of the rib eye muscle (not shown) which runs along substantially the entire length of the backbone of the pig carcass 10.

Conventionally, the blade bone tip 22 is removed, usually by hand, so that the shoulder cut 12 can be ground up for sausage or bulk packed and frozen prior to the butchering process of the present invention. Those skilled in the art will appreciate that the present invention operates equally well whether the blade bone tip 22 is removed from the shoulder cut 12 or remains in the shoulder cut 12. Conventionally, the shoulder cut 12 is cut in half so that the resulting halves can be packed and frozen prior to the butchering process of the present invention, although those skilled in the art will appreciate that, the present method operates equally well whether or not the shoulder cut 12 is cut in half, as long as if the shoulder cut 12 is cut in half, the rib eye muscle portion 20 remains completely in one of the resulting halves of the shoulder cut 12. Prior to the butchering process of the present invention, the shoulder cut 12 is defrosted, if such defrosting is required. The butchering process of the present invention may begin while the shoulder cut 12 is still partially frozen since partially frozen meat may be easier to cut in some circumstances. However, those skilled in the art will appreciate that the present invention operates equally well whether or not the shoulder cut 12 is partially frozen prior to cutting.

In the presently preferred embodiment, the shoulder cut 12 is prepared for cutting by first locating the rib eye muscle portion 20 using conventional means (such as visually locating the rib eye muscle portion 20 or locating the rib eye muscle portion 20 by touch) and then cutting the shoulder cut 12 to remove substantially the entire rib eye muscle portion 20 from the shoulder cut 12. The rib eye muscle portion 20 is preferably cut from the shoulder cut 12 utilizing a meat knife (not shown), but any other suitable cutting implement or instrumentality, such as a power meat saw, may be used.

Figure 3:
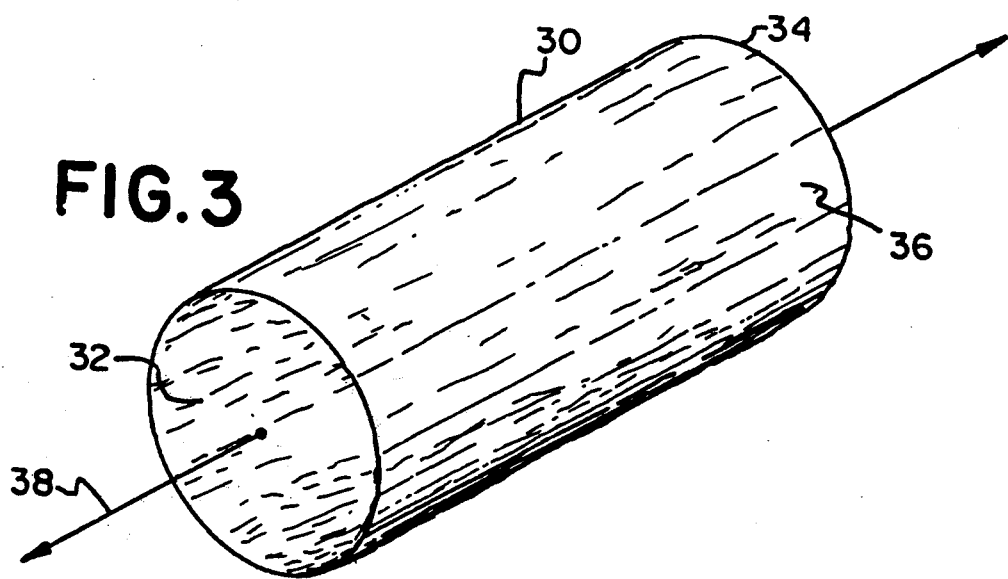
FIG. 3 is an enlarged perspective view of the rib eye muscle portion of FIG. 2, wherein the rib eye muscle portion has been removed from the pork shoulder and has bee trimmed.

After the rib eye muscle portion 20 is removed from the shoulder cut 12, the removed rib eye muscle portion 20 is trimmed to remove excess fat, etc., and to form a generally boneless, generally reduced fat, generally cylindrically shaped rib eye muscle base 30 having two generally circular shaped end surfaces 32 and 34, a generally continuous curved outer surface 36 extending between the two end surfaces 32 and 34, and a central axis 38 extending generally through the radial center of each of the end surfaces 32 and 34. The cylindrically shaped base 30 is best shown in FIG. 3, which is a perspective view of the trimmed rib eye muscle portion 20 as just described. The cylindrically shaped base 30 has a visual grain look when it is cut crosswise to the muscle. Depending upon the size of the particular pig carcass 10, and correspondingly the size of the particular rib eye muscle portion 20, the distance between the two end surfaces 32 and 34 typically ranges from a minimum of about three inches to a maximum of about twelve inches and the diameter of the cylindrically shaped base 30 typically ranges from a minimum of about two inches to a maximum of about six inches. The ranges of the length and diameter of the cylindrically shaped base 30 may vary, however, depending on the size of the particular pig carcass. Note that in trimming the rib eye muscle portion 20 the skin and underlying fat in excess of a predefined, permissible thickness are removed. Preferably, the predefined, permissible thickness is one-quarter inch, but may vary depending upon consumer tastes, intended cooking methods, intended packaging methods, and other factors.

Instead of trimming the removed rib eye muscle portion 20 to form the generally cylindrically shaped base 30 (as described above), or in addition to trimming the removed rib eye muscle portion 20, the removed rib eye muscle portion 20 may be pressed using a well-known meat press (not shown) to form the generally cylindrically shaped rib eye muscle base 30. The removed rib eye muscle portion 20 is preferably pressed using a Betcher or Ross meat press, but any other suitable meat press implement or instrumentality available from any manufacturer may be used. The pressing step as just described is particularly useful when the removed rib eye muscle portion 20 is irregularly shaped or otherwise not generally cylindrically shaped.

FIG. 4 is a side elevation view of the cylindrically shaped base 30 and FIG. 5 is a sectional view of the cylindrically shaped base 30 taken along line 5—5 of FIG. 4. As best seen in FIGS. 4 and 5, after the cylindrically shaped base 30 is formed as described above, the method of the present invention for making a generally flat, boneless meat product (called, in the preferred embodiment, a pork shoulder steak) continues by making a first cut 50. The first cut 50 extends into the cylindrically shaped base 30 a predetermined distance 52 from the curved outer surface 36 along a cut line 42. The cut line 42 extends generally from one end surface 32 to the other 34 along the curved outer surface 36 and generally parallel to the center axis of the cylindrically shaped base 30. The first cut is preferably made utilizing a steak or meat knife (not shown), but could be made utilizing any other suitable implement or instrumentality, such as a hand saw or power meat saw.

Those skilled in the art will appreciate that the first cut 50 may be made into the cylindrically shaped base 30 at any angle appropriate for later making a second cut (described below) and for forming a pork shoulder steak 70 (FIG. 7) of a desired thickness. The cut angle is shown in FIG. 5 as 54. The cut angle 54 may be between thirty degrees and sixty degrees with respect to a plane 56 extending radially from the curved outer surface 36 to the center axis 38 of the cylindrically shaped base 30, but preferably the cut angle 54 is about forty-five degrees with respect to the plane 56 extending radially from the curved outer surface 36 to the center axis 38 of the cylindrically shaped base 30. As described in greater detail below, the predetermined distance 52 to which the first cut extends into the curved outer surface 36 generally determines the thickness of the pork shoulder steak 70 which is the product of the process of the present method. Therefore, the value of the predetermined distance 52 varies according to the desired thickness of the pork shoulder steak 70 as dictated by a number of factors, including consumer demand and product cost, but is preferably in the range of one-quarter inch to one-half inch.

After the first cut 50 is made, a second cut is made into the cylindrically shaped base 30 extending from the termination of the first cut 50 and extending generally circumferentially with respect to the cylindrically shaped base 30 at the predetermined distance 52 from the curved outer surface 36. The second cut extends generally from one end surface 32 to the other end surface 34 and generally parallel to the center axis 38 of the cylindrically shaped base 30. The second cut continues to extend to the center axis 38 of the cylindrically shaped base 30 along a generally helically shaped path when viewing the cylindrically shaped base 30 from either end 32 or 34. The completed second cut is best shown in FIG. 6, which is an end view of the cylindrically shaped base 30 after the second cut is made, the second cut line being indicated at 60. In making the first cut 50 and second cut 60, the cylindrically shaped base 30 is preferably cut with the grain of the rib eye muscle portion 20, rather than against or across the grain as is conventionally done when cutting meats. Cutting with the grain produces a pork shoulder steak 70 which is relatively chewier than meats cut against or across the grain, and having a consistency similar to pork spare ribs.

As the second cut 60 is made, a generally flat meat product 70 is continuously removed or unrolled from the cylindrically shaped base 30. The flat meat product 70 has a width W generally corresponding to the distance between the two end surfaces 32 and 34, a thickness T generally corresponding to the predetermined distance 52 associated with the first and second cuts 50, 60, and a length L determined by the length of the second cut 60 extending from the first cut 50 to the center axis of the cylindrically shaped base 30. After the flat meat product 70 is completely unrolled and the second cut 60 is completed, one surface may be lightly scored, along one but preferably along a plurality of generally parallel, spaced lines 72 extending generally along the length of the meat product 70 using either manual or automated scoring procedures which are well known in the art. The scoring lines 72 are useful for preventing the meat product 70 from rolling up on its sides as it is cooked. Those skilled in the art will recognize that the scoring step is optional and that the flat meat product 70 is equally useful with or without the scoring lines 72.

FIG. 7 is a perspective view of a pork shoulder steak 70 which is the generally flat, boneless meat product of the process of the present invention, wherein the scoring lines are indicated by 72. The present invention also encompasses the pork shoulder steak 70, both with and without the scoring lines 72, produced by the described method. The pork shoulder steak 70 so produced is generally a flat, boneless pork meat product comprising meat from the rib eye muscle portion of the shoulder cut of a pig carcass.

The present invention includes an alternate method for producing the pork shoulder steak 70. According to the alternate method of the present invention, the cylindrically shaped base 30 as shown in FIG. 3 is produced using the procedure described above. After the cylindrically shaped base 30 is formed, the cylindrically shaped base 30 is cut along a cut line extending from one end surface 32 to the other end surface 34, the cut line being generally helically shaped when viewing either end surface 32 or 34 and extending from the curved outer surface 36 to the center axis of the cylindrically shaped base 30.

Figure 8:
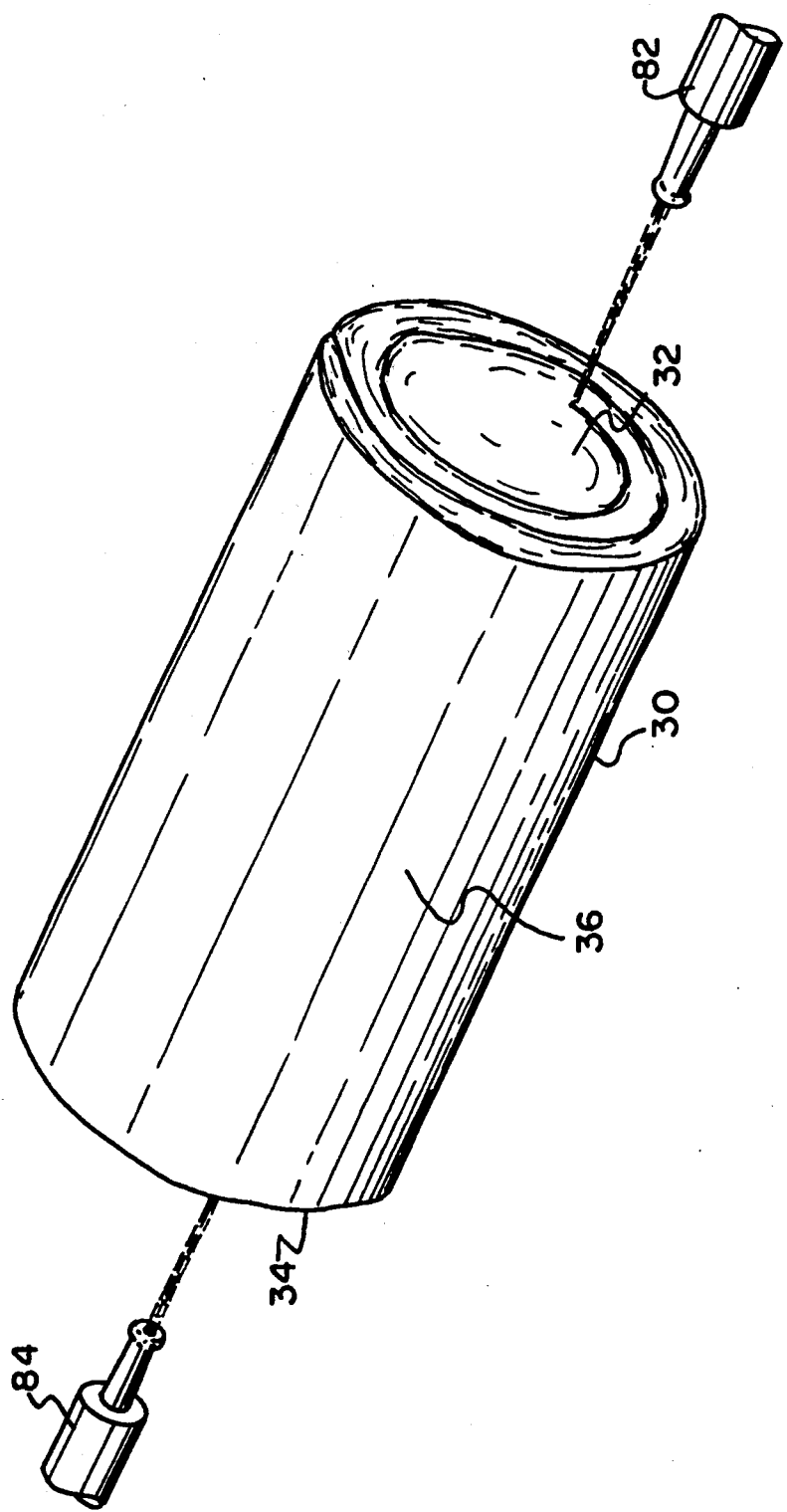
FIG. 8 is a perspective schematic view of the trimmed rib eye muscle portion as a helically shaped cut is made using water knives.

Preferably, a helically shaped cutting instrument is used to make the helically shaped cut just described, wherein the helically shaped cutting instrument is generally in the shape of the second cut 60 shown in FIG. 6. Alternatively, the helically shaped cut may be generated using a liquid emitting knife such as water knives 82 and 84 as shown in FIG. 8, wherein the helically shaped cut is partially complete. The water knife 82 cuts the cylindrically shaped base 30 by directing a narrow stream of water at high pressure at the end surface 32 of the base 30. As is well known, currently available water knives have a cutting range of approximately two-and-one-half inches. Since the distance between the two end surfaces 32 and 34 of the cylindrically shaped base 30 is typically greater than three inches (as noted above), a second water knife 84 is required to cut the cylindrically shaped base 30 from the other end surface 34 (as shown in FIG. 8) in order to generate the helically shaped cut extending from one end surface 32 to the other end surface 34 of the base 30. It should be understood that as technology advances to increase the cutting range of water knives, only a single cutting knife will be required to generate the helically shaped cut extending from one end surface 32 to the other end surface 34 of the cylindrically shaped base 30. The water knives 82 and 84 are preferably driven in synchronization with one another and in a generally helically shaped pattern by motors (not shown) connected to the water knives 82 and 84 in order to generate the helically shaped cut line.

After the helically shaped cut is made, a generally flat meat product is unrolled from the cylindrically shaped base 30, the flat meat product being substantially as described above, wherein the flat meat product has a width W generally corresponding to the distance between the two end surfaces 32 and 34, a thickness T generally corresponding to the radial distance between adjacent radially separated portions of the helically shaped cut line, and a length L determined by the length of the helically shaped cut line from the curved outer surface 36 to the center axis of the cylindrically shaped base 30.

The present butchering methods for generating the pork shoulder steak 70 may be performed manually or by a suitable automated procedure or apparatus (not shown). An appropriate automated procedure performs the steps (for either of the methods described above) in generally the same manner and sequence disclosed above.

From the foregoing description, it can be seen that the present invention comprises new and useful methods for butchering a portion of an animal carcass for producing a flat, boneless meat product wherein the animal carcass portion being butchered contains a meat or muscle portion which is boneless and generally cylindrically shaped. In the preferred embodiment, a rib eye muscle portion contained in the shoulder cut of a pig carcass is butchered according to the present method to produce a pork shoulder steak. The present invention also comprises the generally flat, boneless meat product (in the preferred embodiment called the pork shoulder steak) which is formed by the present methods. The present methods are relatively quick and easy to employ for butchering animal carcasses and the resulting flat, boneless meat products represent more efficient, desirable, and profitable utilizations of available meat. It will be recognized by those skilled in the art that the present invention may be embodied in other specific forms without departing from the spirit or essential attributes thereof and, accordingly, reference should be made to the appended claims, rather than to the foregoing specification, as indicating the scope of the invention.

What is claimed is:

1. A method of forming a generally flat, boneless meat product from a shoulder cut of an animal having a rib eye muscle portion comprising:

cutting the shoulder to remove the rib eye muscle portion;

forming from the removed rib eye muscle portion a generally cylindrically shaped base having two generally circular spaced end surfaces, a generally continuous curved outer surface extending between the two end surfaces, and a center axis extending generally through the radial center of each of the end surface thereof;

making a first cut extending into the cylindrically shaped base a predetermined distance from the curved outer surface along a cut line extending generally from one end surface to the other along the curved outer surface and generally parallel to the center axis;

making a second cut extending from the first cut and extending generally circumferentially with respect to the cylindrically shaped base at said predetermined distance from the curved outer surface and extending generally from end surface to the other along the cylindrically shaped base, and generally parallel to the center axis, the second cut continuing to extend to the center axis of the cylindrically shaped base along a generally helically shaped path when viewing the cylindrically shaped base from either end; and removing generally continuously from the cylindrically shaped base, as the second cut is made, a generally flat meat product having a width generally corresponding to the distance between the two end surfaces, having a thickness generally corresponding to said predetermined distance and having a length determined by the length of the second cut extending from the first cut to the center axis.

2. The method as recited in claim 1 wherein the first cut extends into the cylindrically shaped base at an angle of between 30° and 60° with respect to a plane extending radially from the curved outer surface to the center axis.

3. The method as recited in claim 2 wherein the angle is 45°.

4. The method as recited in claim 1 wherein the animal is a pig.

5. The method as recited in claim 1 wherein the predetermined distance and the thickness of the meat product is between ¼ inch and ½ inch.

6. The method as recited in claim 1 wherein the distance between the two end surfaces is in the range of 3 inches to 12 inches.

7. The method as recited in claim 1, further comprising the step of scoring one surface of the meat product along a line extending generally along the length thereof.

8. A boneless meat product formed in accordance with the method set forth in claim 1.

9. A method of forming a generally flat boneless meat product from a shoulder cut of an animal having a rib eye muscle portion, comprising:

cutting the shoulder to remove the rib eye muscle portion to provide a generally cylindrically shaped base having a pair of generally circular spaced end surfaces, a generally curved outer surface extending between the two end surfaces, and a center axis extending generally through the radial center of each of the end surfaces;

cutting the cylindrically shaped base along a cut line extending from one end surface to the other end surface, the cut line being generally helically shaped when viewing either end surface and extending from the curved outer surface to the center axis; and unrolling from the cylindrically shaped base a generally flat meat product having a width generally corresponding to the distance between the two end surfaces, having a thickness generally corresponding to the radial distance between adjacent radially separated portions of the helically shaped cut line and having a length determined by the length of the helically shaped cut line from the curved outer surface to the center axis.

10. The method as recited in claim 9 wherein the animal is a pig.

11. The method as recited in claim 9 wherein the radial distance and the thickness of the meat product is between ¼ inch and ½ inch.

12. The method as recited in claim 9 wherein the distance between the two end surfaces is in the range of 3 inches to 12 inches.

13. The method as recited in claim 9, further comprising the step of scoring one surface of the meat product along a line extending generally along the length thereof.

14. A boneless meat product formed in accordance with the method set forth in claim 9.

15. The method as recited in claim 9, wherein the step of cutting the cylindrically shaped base comprises cutting the cylindrically shaped base using a water knife.

16. A method for forming a generally flat, boneless meat product from a boneless muscle portion of an animal carcass, comprising the steps of:
  cutting the animal carcass to remove the muscle portion;
  forming from the removed muscle portion a generally cylindrically shaped base having two generally circular spaced end surfaces, a generally continuous curved outer surface extending between the two end surfaces, and a center axis extending generally through the radial center of each of the end surfaces thereof;
  making a first cut extending into the cylindrically shaped base a predetermined distance from the curved outer surface along a cut line extending generally from one end surface to the other along the curved outer surface and generally parallel to the center axis;
  making a second cut extending from the first cut and extending generally circumferentially with respect to the cylindrically shaped base at said predetermined distance from the curved outer surface and extending generally from end surface to the other along the cylindrically shaped base, and generally parallel to the center axis, the second cut continuing to extend to the center axis of the cylindrically shaped base along a generally helically shaped path when viewing the cylindrically shaped base from either end; and
  removing generally continuously from the cylindrically shaped base, as the second cut is made, a generally flat meat product having a width generally corresponding to the distance between the two end surfaces, having a thickness generally corresponding to said predetermined distance and having a length determined by the length of the second cut extending from the first cut to the center axis.

17. The method of claim 16, wherein the animal carcass is a pig carcass having a shoulder and the muscle portion is a rib eye muscle portion contained in the shoulder.

18. The method of claim 17, wherein the step for cutting the animal carcass to remove the muscle portion comprises the step of cutting the shoulder of the pig carcass to remove the rib eye muscle portion contained in the shoulder.

19. A method of forming a generally flat boneless meat product from a boneless, generally cylindrically shaped muscle portion of an animal carcass, comprising the steps of:
  cutting the animal carcass to remove the muscle portion to provide a generally cylindrically shaped base having a pair of generally circular spaced end surfaces, a generally curved outer surface extending between the two end surfaces,,and a center axis extending generally through the radial center of each of the end surfaces;
  cutting the cylindrically shaped base along a cut line extending from one end surface to the other end surface, the cut line being generally helically shaped when viewing either end surface and extending from the curved outer surface to the center axis; and
  unrolling from the cylindrically shaped base a generally flat meat product having a width generally corresponding to the distance between the two end surfaces, having a thickness generally corresponding to the radial distance between adjacent radially separated portions of the helically shaped cut line and having a length determined by the length of the helically shaped cut line from the curved outer surface to the center axis.

20. The method of claim 19, wherein the animal carcass is a pig carcass having a shoulder and the muscle portion is a rib eye muscle portion contained in the shoulder.

21. The method of claim 20, wherein the step for cutting the animal carcass to remove the muscle portion comprises the step of cutting the shoulder of the pig carcass to remove the rib eye muscle portion contained in the shoulder.

22. The method as recited in claim 19, wherein the step of cutting the cylindrically shaped base comprises cutting the cylindrically shaped base using a water knife.

* * * * *